Jan. 22, 1929.
W. C. JONES
1,700,113
STEEL LUMBER
Filed Oct. 26, 1925    2 Sheets-Sheet 1
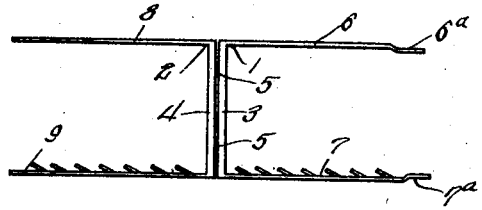
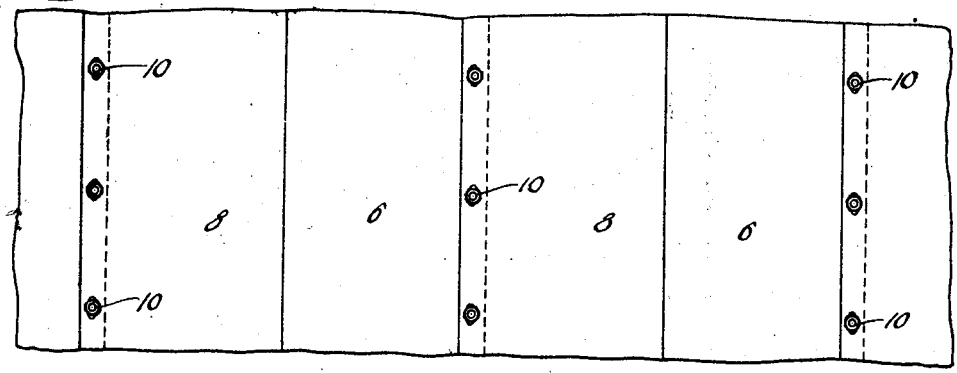
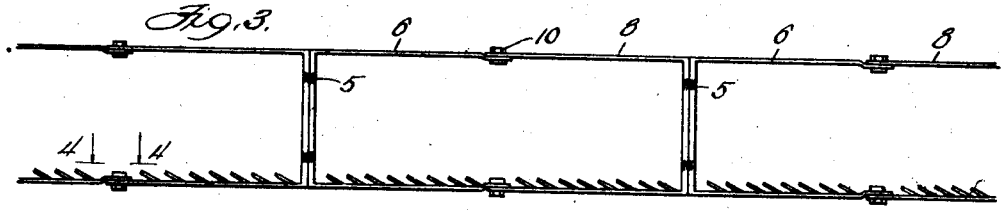
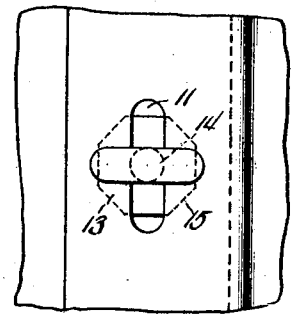
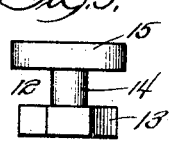
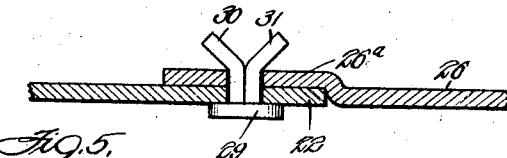
Inventor:
WALTER CLYDE JONES Jan. 22, 1929.
W. C. JONES
STEEL LUMBER
Filed Oct. 26, 1925
1,700,113
2 Sheets-Sheet 2
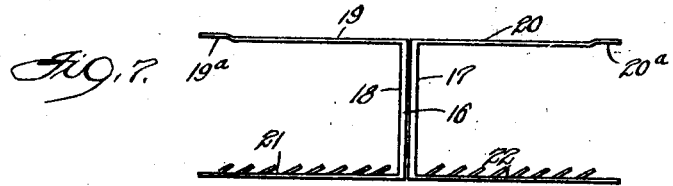
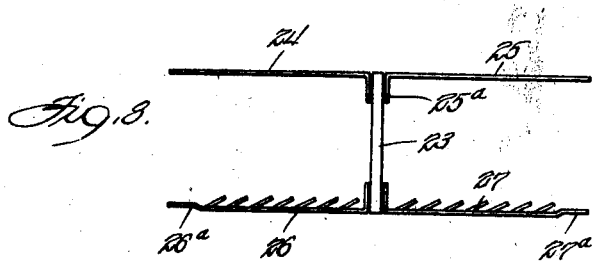
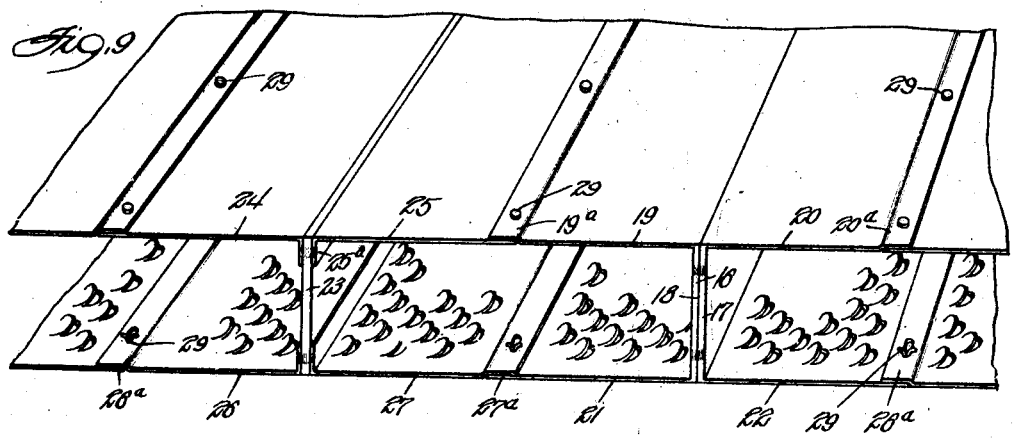
Witness:
W. K. Olson
Inventor:
WALTER CLYDE JONES.
Jones, Addington, Ames & Seibold
Attys.

Patented Jan. 22, 1929.

1,700,113

UNITED STATES PATENT OFFICE.

WALTER CLYDE JONES, OF EVANSTON, ILLINOIS; WALTER CLYDE JONES, JR., EXECUTOR OF SAID WALTER CLYDE JONES, DECEASED.

STEEL LUMBER.

Application filed October 26, 1925. Serial No. 64,767.

My invention relates to steel lumber and it has special reference to steel lumber combination sections that are utilized in a building construction.

More particularly my present invention refers to steel lumber combination sections that may serve in a building construction as a substitute for wooden joists, wooden rafters, wooden studding, wooden lathing, wooden flooring and the like and, at the same time, perform the functions required of such corresponding wooden members in a much more satisfactory manner. As a result of my present invention, a building construction employing my steel lumber may be made substantially fireproof or, at least, the fire hazard thereof may be reduced to a minimum.

Also, the steel lumber combination section of my present invention may be conveniently and economically manufactured from a plurality of members that are permanently secured together at the factory or before installation to form a self contained combination section that can be readily handled, shipped and installed without employing any skilled labor, such as skilled metal workers and the like. My steel lumber is fabricated into unitary sections prior to installation which are properly fitted and matched before installation thereby eliminating all field work and mistakes and waste of time incidental thereto.

To compare specifically wooden lumber members that have heretofore entered into a building construction with the steel lumber combination sections of my present invention, I may state that wooden lumber sections, such as joists, rafters, studs, lathing, flooring and the like, are made in separate and individual pieces, each requiring a separate manufacturing operation, as well as separate handling and assembling in order to incorporate them properly into a building construction. Moreover, the matching and fitting of such wooden lumber sections required expert labor and considerable field work. The steel lumber of my present invention constitutes a built-up section that may serve as a combination studding portion and interior lathing and exterior lathing portions, or as a combination joist portion and lathing and flooring portions, or any other suitable combination of members entering into a building construction, such as a combination relatively thick or heavy weight supporting portion and relatively thin or light sustaining plate portions.

For a better understanding of the nature, scope and characteristic features of my present invention, reference may be had to the following description and the accompanying drawings, in which—

Figure 1 is a cross sectional view of a steel lumber combination section embodying one form of my present invention;

Fig. 2 is a plan view of a building construction, such as is illustrated in Fig. 3, in which the lumber sections of Fig. 1 are assembled together;

Fig. 3 is a cross sectional view of the building construction shown in Fig. 2 in which the steel lumber combination sections of Fig. 1 are incorporated;

Fig. 4 is a plan view taken along the line 4—4 of Fig. 3 showing the attaching devices for securing together the adjacent lumber sections of my invention;

Fig. 5 is a view in elevation of an attaching device, such as is illustrated in Fig. 4;

Fig. 6 is a view partially in elevation and partially in section showing a modified form of an attaching device;

Fig. 7 is a cross sectional view of a steel lumber combination section embodying another form of my present invention;

Fig. 8 is a cross sectional view of a steel lumber section embodying still another modification of my present invention; and Fig. 9 is a cross sectional view of a building construction in which the steel lumber combination sections of Figs. 7 and 8 are incorporated.

Referring to Fig. 1, the double U-shaped steel lumber section herein illustrated comprises two U-shaped integrally formed steel members 1 and 2 that are placed back to back so that a portion 3 of the section 1 is co-extensive with a portion 4 of the member 2. The portions 3 and 4 are permanently secured to each other by means of spot-welds 5. Any other suitable means for permanently securing the two members 1 and 2 to each other may be substituted for the spot welds 5. The member 1 comprises the aforementioned central portion 3 which is a relatively thick portion and from which relatively thin sustaining plate portions 6 and 7 extend laterally. The sustaining plate portion 7 may be perforated, as shown in Figs. 1 and 3 in order that it may serve as a lathing, either exteriorly or interiorly for the building construction. The sustaining plate portion 6 is shown as being solid and, as such, may serve as a flooring member of a building construction or as an exterior siding. The sustaining plate portion 6 is provided at its outer edge with an offset portion 6ª and, similarly, the sustaining plate portion 7 is provided at its outer edge with an offset portion 7ª.

In the specific example illustrated in this figure, the member 2 may comprise the relatively thick central portion 4, a laterally projecting sustaining plate portion 8 and a second laterally extending sustaining plate portion 9, the latter being perforated in order that it may serve the same purpose as the sustaining plate portion 7.

The built-up section, when the portions 3 and 4 are permanently secured to each other, constitutes a double U-shaped self contained steel lumber combination section having a relatively thick or heavy weight supporting studding portion that is formed by the portions 3 and 4 and laterally extending sustaining plate portions 6 and 8, 7 and 9, that extend laterally from the studding portion in both directions and adjacent to its edge.

The term "studding portion" as used herein comprises in its means such members as joists, studs and the like that are adapted to serve as the weight-supporting elements or members of a building construction. Likewise, the terms "sustaining plate portion", "lathing portion", "flooring" and "siding" are used synonymously and comprise in their meaning lathing, either internal or external, on the ceiling or side walls, or flooring or siding and the like, which elements of a building construction are relatively thin and light in weight in comparision to the relatively thick or heavy weight supporting studs or joists and are of sufficient width, in conjunction with corresponding members of adjoining lumber sections, to span the space between the studding portions of adjacent lumber sections.

In conformity with standard dimensions and spacings of wooden lumber members employed in a building construction, the longitudinal dimensions of the steel lumber combination section of Fig. 1, as well as the combination sections illustrated in the other figures of the drawings, may be made up into any suitable lengths—namely 12 feet, 14 feet, 16 feet and the like, corresponding to the standard lengths in which wooden lumber members that enter into a building construction have been furnished in the past. Similarly, the steel lumber combination sections herein illustrated and described may have their studding portions so proportioned that the height thereof is from 4 inches to 6 inches and, when built up as herein described, are about 1/8" thick. The sustaining plate portions 6, 7, 8 and 9 may be approximately 3/32" thick and from 8 to 10 inches wide.

In a building construction employing wooden lumber, it is customary to space the studding, such as the joists, studs or weight supporting members, on approximately 16" to 18" centers and, consequently, I have suggested 8 inches to 10 inches as suitable transverse dimensions for the relatively thin sustaining plate portions 6, 7, 8 and 9 for the reason that when the steel lumber combination sections are positioned side-by-side in a building construction, the sustaining plate portions 6 and 7 may span substantially one half of the distance between the studding portions of adjacent lumber sections.

In view of the fact that the lathing portions or flooring portions between adjacent studding portions comprise two contiguous sustaining plate portions, each extending approximately one half of the distance between adjacent studding portions, it is necessary for the adjoining sustaining plate portions to be secured to one another, preferably by overlapping them, as hereinafter to be described. Since the usual depth of wooden studs or joists embodied in a building structure may range from 4" to 6", I have suggested a corresponding transverse dimension or height for the central relatively thick weight supporting studding portion of my steel lumber combination sections. Of course, it is to be understood that I am not to be limited to any arbitrary dimensions or proportions that I have specified herein, inasmuch as my steel lumber combination section is capable of being made up so as to accommodate any suitable dimensions that may be desired.

In Figs. 2 and 3 I have illustrated how the steel lumber sections of Fig. 1 may be assembled in a building construction. The steel lumber combination sections, such as illustrated in Fig. 1, are placed side-by-side. The offset portions 6ª of the upper sustaining plate portion 6 receives the outer edge of the sustaining plate portion 8 of the adjoining steel lumber combination section. Similarly, the offset portion 7ª of the lower sustaining plate portion 7 receives the outer edge of the lower sustaining plate portion 9 of the adjoining steel lumber combination section. In this fashion, the sustaining plate portions 6, 8 and corresponding portions of the adjoining lumber sections form a contiguous and substantially coplanar surface that may serve as a flooring for an upper story. Similarly, the sustaining plate portions 7, 9 and corresponding plate portions of the adjoining lumber sections may form a contiguous coplanar surface that may constitute the lathing for the ceiling of the story below.

It is to be noted that the adjoining lumber sections are attached to one another by means of the attaching devices 10 and in Figs. 4 and 5 I have shown in detail the construction and employment of these attaching devices. The sustaining plate portions of the combination sections of Fig. 1 are provided adjacent to their edges at spaced intervals with longitudinal or elongated openings 11 and, when the steel lumber sections are in assembled position as shown in Figs. 2 and 3, the edges of the sustaining plate portions overlap each other in order that the corresponding openings 11 may register with each other. An attaching device 12, comprising an hexagonal head 13, a shank 14 and a transversely extending bar portion 15, is projected through the registering openings 11 by extending the bar portion 15 therethrough. By means of the exposed hexagonal head portion 13 the portion 15 is moved at right angles to its direction of entry through the longitudinal openings 11. In this fashion, the outer edges of adjoining plate sustaining portions are secured to one another, substantially as shown in Figs. 2 and 3.

From the foregoing it is to be observed that the building construction of Figs. 2 and 3 is made up of a plurality of side-by-side steel lumber combination sections, each of which constitutes a double U-shaped central relatively thick or heavy weight supporting building element from both edges of which sustaining plate portions extend in opposite directions. The combination sections are self constituted units built up from a plurality of members that are permanently secured to each other at the factory or before installation. The combination sections are assembled in a building construction without requiring any fitting or matching of the sections and, moreover, they are readily attached to one another without requiring any field work prior to installation, or the services of skilled labor in connection therewith.

In Fig. 7 a steel lumber combination section is shown comprising a relatively thick or heavy weight supporting studding portion 16 formed by placing central portions 17 and 18 of two U-shaped elements back to back and securing them permanently to each other in any suitable manner. From the upper edge of the studding portions 16 two sustaining plate portions 19 and 20 project in opposite directions, the former being provided with an offset 19$^a$ at its outer end and the latter being provided with an offset 20$^a$ at its outer end. From the lower edge of the studding portion 16 two sustaining plate portions 21 and 22 project in opposite directions. The sustaining plate portions 21 and 22 may be perforated, as shown, and as such may serve as the lathing in a building construction. The sustaining plate portions 19 and 20 may constitute an unbroken surface and, as such, may serve as the flooring or siding in a building construction. The portions 17, 20 and 22 are shown as constituting a unitary integral section and, similarly, the portions 18, 19 and 21. The offsets 19$^a$ and 20$^a$ serve the same function as the offsets 6$^a$ and 7$^a$ in the steel lumber combination section illustrated in Fig. 1.

In Fig. 8 I have shown a modified form of a steel lumber combination section which comprises a relatively thick studding portion 23 formed from a single unitary member. Sustaining plate portions 24 and 25 are secured at the upper edge of the studding portion 23 and project laterally therefrom in opposite directions. Sustaining plate portions 26 and 27 are secured to the lower edge of the studding portion 23 and project laterally therefrom in opposite directions. Each of the sustaining plate portions may be similarly formed from a thin sheet that is bent at right angles on one of its edges in order to provide a flange such as the flange 25$^a$ of the sustaining plate portion 25. The sustaining plate portion 25 may be permanently secured by welding or otherwise to the studding portion 23. The other sustaining plate portions 24, 26 and 27 may likewise be permanently secured to the studding portion 23. The sustaining plate portions 26 and 27 are provided at their outer edges with offset portions 26$^a$ and 27$^a$, respectively.

In Fig. 9 I have shown a building construction in which the alternate steel lumber combination sections are built in accordance with the steel lumber combination section illustrated in Fig. 7, while the intervening steel lumber combination sections are similar to the one shown in Fig. 8. These two forms of steel lumber sections are placed side-by-side so that the outer edge of the sustaining plate portion 25 is received in the recess 19$^a$ formed in the outer edge of the sustaining plate portion 19, while the outer edge of the sustaining plate portion 21 is received in the offset portion 27$^a$ formed in the outer edge of the sustaining plate portion 27. In this manner, the upper sustaining plate portions unite to form a contiguous substantially coplanar surface that may serve as the flooring of a building construction. Similarly, the lower sustaining plate portions of the steel lumber combination sections form a contiguous substantially coplanar surface that may serve as lathing for the ceiling of the story below.

The outer edges of adjoining sustaining plate portions may be secured to each other by means of attaching devices 29 which are illustrated, in detail, in Fig. 6, to which reference may now be had. The attaching devices 29 are in the nature of pins having split bifurcated shanks to form diverging legs 30 and 31. The outer edges of the sustaining plate portions are perforated with elongated openings that are correspondingly located in order that the openings will register with each other when overlapping the edges of the adjacent sustaining plate portions. The bifurcated pins 29, having their diverging legs 30 and 31 already formed thereon, are then projected through the registering openings and turned at right angles from their position of entry in order to secure permanently the sustaining plate portions to one another.

From the foregoing description of my invention, it will be apparent that I have provided a new form of steel lumber combination section which may be readily fabricated from a plurality of steel members which permits of convenient assembly and incorporation into a building construction.

While I have herein shown and described several embodiments of my invention, it is to be understood that I do not desire to be limited to the specific structure shown and described therein, inasmuch as many modifications may be made in my present invention without departing from the spirit and scope of the appended claims.

I claim:

1. A double U-shaped self-contained permanently organized steel lumber combination section adapted to be fabricated completely before installation, comprising a relatively thick weight supporting studding portion and relatively thin sustaining plate portions extending laterally therefrom.

2. A double U-shaped self-contained permanently organized steel lumber combination section adapted to be fabricated completely before installation, comprising a relatively thick weight supporting studding portion, and relatively thin sustaining plate portions extending laterally therefrom, said lumber combination section being built up from a plurality of members that are permanently secured to one another by welding or other equivalent means.

3. A double U-shaped self-contained permanently organized steel lumber combination section adapted to be fabricated completely before installation, comprising a relatively thick weight supporting studding portion, and relatively thin sustaining plate portions extending laterally and in opposite directions from said studding portion adjacent to its edges.

4. A double U-shaped self-contained permanently organized steel lumber combination section adapted to be fabricated completely before installation, comprising a relatively thick weight supporting studding portion, and two relatively thin sustaining plate portions extending laterally and in opposite directions adjacent to each edge of said sustaining portion.

5. A double U-shaped self-contained permanently organized steel lumber combination section adapted to be fabricated completely before installation, comprising a relatively thick weight supporting studding portion, and relatively thin sustaining plate portions extending laterally therefrom, said combination lumber section being built up from two U-shaped steel lumber sections placed back to back and permanently secured to each other.

6. A double U-shaped self-contained permanently organized steel lumber combination section adapted to be fabricated completely before installation, comprising a relatively thick weight supporting studding portion, and relatively thin sustaining plate portions extending laterally therefrom and each possessing a width, in conjunction with adjoining lumber sections, to span the space between the studding portions of adjacent lumber sections.

7. A double U-shaped self-contained permanently organized steel lumber combination section adapted to be fabricated completely before installation, comprising a relatively thick weight supporting studding portion and relatively thin sustaining plate portions constituting closure members extending laterally therefrom.

8. A double U-shaped self-contained permanently organized steel lumber combination section adapted to be fabricated completely before installation, comprising a relatively thick weight supporting studding portion, and relatively thin sustaining plate portions constituting closure members extending laterally therefrom, said lumber combination section being built up from a plurality of members that are permanently secured to one another by welding or other equivalent means.

9. A double U-shaped self-contained permanently organized steel lumber combination section adapted to be fabricated completely before installation, comprising a relatively thick weight supporting studding portion, and relatively thin sustaining plate portions constituting closure members extending laterally and in opposite directions from said studding portion adjacent to its edges.

10. A double U-shaped self-contained permanently organized steel lumber combination section adapted to be fabricated completely before installation, comprising a relatively thick weight supporting studding portion, and relatively thin sustaining plate portions extending laterally therefrom and each a width to extend intermediate of the space between the studding portions of adjacent lumber sections.

11. A double U-shaped self-contained permanently organized steel lumber combination section adapted to be fabricated completely before installation, comprising a relatively thick weight supporting studding portion, and relatively thin sustaining plate portions extending laterally therefrom, each of said sustaining plate portions possessing a width terminating intermediate of the space between the studding portions of adjacent lumber sections, the corresponding sustaining plate portions of the adjoining lumber sections overlapping each other to span completely the space between the studding portions of adjacent lumber-sections.

12. A double U-shaped self-contained permanently organized steel lumber combination section adapted to be fabricated completely before installation, comprising a relatively thick weight supporting studding portion and relatively thin sustaining plate portions extending laterally therefrom, each of said sustaining plate portions possessing a width terminating intermediate of the space between the studding portions of adjacent lumber sections, the corresponding sustaining plate portions of the adjoining lumber sections overlapping each other to span the space between the studding portions of adjacent lumber sections, and means for attaching contiguous sustaining plate portions of adjacent lumber sections to each other.

13. A building construction comprising side-by-side double U-shaped steel lumber combination sections, each combination section adapted to be fabricated completely and permanently organized before installation and constituting a self-contained unitary combination building element which comprises a relatively thick weight supporting studding portion and relatively thin sustaining plate portions extending laterally therefrom and adjacent to the edges of said studding portion, said sustaining plate portions being of sufficient width, in conjunction with corresponding plate portions of the adjoining lumber sections to span the spaces between the studding portions of adjacent lumber sections, the said combination lumber sections, when in assembled positions, having their sustaining plate portions contiguous and being secured at their outer ends to the sustaining plate portions of the adjoining lumber sections.

In witness whereof, I have hereunto subscribed my name.

WALTER CLYDE JONES.